United States Patent
Muhonen et al.

(10) Patent No.: US 6,501,957 B2
(45) Date of Patent: Dec. 31, 2002

(54) METHOD AND NETWORK ELEMENT FOR FORWARDING MULTICAST MESSAGES

(75) Inventors: Ahti Muhonen, Helsinki (FI); Michael Rooke, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/954,370

(22) Filed: Sep. 17, 2001

(65) Prior Publication Data

US 2002/0049066 A1 Apr. 25, 2002

Related U.S. Application Data

(63) Continuation of application No. PCT/EP99/01969, filed on Mar. 19, 1999.

(51) Int. Cl.$^7$ .............................................. H04B 15/00
(52) U.S. Cl. ........................ 455/503; 455/414; 455/517; 455/519; 455/426
(58) Field of Search ................................. 455/414, 503, 455/517–519, 426, 466; 340/7.26

(56) References Cited

U.S. PATENT DOCUMENTS 6,032,051 A * 2/2000 Hall et al. ................... 455/518

OTHER PUBLICATIONS

George Xylomenos and George C. Polyzos; "IP Multicast for Mobile Hosts", IEEE Communications Magazine, IEEE Service Center, Piscataway, N.J., vol. 35, No. 1, pp. 54–58.

Sven Akesson; "GPRS, General Packet Radio Service", IEEE International Conference on Universal Personal Communications, New York, IEEE Conf. 4, pp. 640–643.

International Search Report for PCt/EP99/01969.

* cited by examiner

Primary Examiner—Doris H. To
(74) Attorney, Agent, or Firm—Altera Law Group, LLC

(57) ABSTRACT

The present invention relates to a method and network element for forwarding a multicast message received from an external packet data network (PDN) to subscribers (MS) of a packet radio network, wherein a subscriber-specific information defining multicast messages to be received by the subscribers is stored in a network element (GGSN) of the packet radio network. Based on this subscriber-specific information, a point to point connection is established between the multicast content provider of the multicast message and a subscriber having joined the corresponding multicast group. The subscriber may request a list of available multicast groups from the network element and may inform the network element of the multicast messages he wants to listen to by using a point to point context activation. Thus, the network element which may be a gateway GPRS support node plays an arbitrator role for multicast messages. Thereby, only minor changes of standard network elements are required.

10 Claims, 2 Drawing Sheets

METHOD AND NETWORK ELEMENT FOR FORWARDING MULTICAST MESSAGES

This application is a continuation of international application Ser. No. PCT/EP99/01969, filed Mar. 19, 1999.

FIELD OF THE INVENTION

The present invention relates to a method and network element for forwarding a multicast message received from an external packet data network, such as the Internet, to subscribers of a packet radio network, such as the General Packet Radio Service (GPRS) network.

BACKGROUND OF THE INVENTION

The GPRS is a new GSM (Global System for Mobile Comnmunication) service that provides actual packet radio access for mobile GSM users. The main benefit of GPRS is that it reserves radio resources only when there is something to send. The same radio resource is shared by all mobile subscribers in a cell, providing effective use of the scarce resources. The need for packet radio is based on the high burstiness of data applications. GPRS facilitates a variety of applications, such as telemetry, train control systems, interactive data access, toll road charging systems, and Internet browsing using the World Wide Web.

When compared with the current circuit switched GSM network, the operation of GPRS is very different. The main objective of GPRS is to offer a connection to standard data network s using protocols such as TCP/IP (Transmission Control Protocol/Internet protocol), X.25, and CLNP (Connection Less Network Protocol).

In order to access the GPRS services, a mobile station (MS) first makes its presence known to a network by performing a GPRS attach. This operation establishes a logical link between the MS and a serving GPRS support node (SGSN), and makes the MS available for messages over GPRS, paging via SGSN, and notification of incoming GPRS data.

In order to transmit and receive GPRS data, the MS activates a desired packet data address. This operation makes the MS known in a corresponding gateway GPRS support node (GGSN), and interworking with external data networks can commence. User data is transferred transparently between the MS and the external data network with a method known as encapsulation and tunneling, wherein data packets are equipped with a GPRS-specific protocol information and transferred between the MS and the GGSN. This transparent transfer method lessens the requirement for a GPRS PLMN (Public Land Mobile Network) to interpret external data protocols, and it enables easy introduction of additional interworking protocols in the future. User data can be compressed and protected with retransmission protocols for efficiency and reliability.

The GPRS supports interworking with networks based on the Internet protocol (IP). The GSM PLMN GPRS service is an IP domain, and services offered to mobile terminals by a GSM service provider are globally addressable through the network operators addressing scheme.

However it has not yet been defined how an MS joins and leaves group calls received from an external packet data network (PDN), e.g. an IP/M group call received from the Internet, and how the GPRS network creates a connection between a multicast content provider and the MS.

SUMMARY OF THE INVENTION

It is therefore an object of the present invention to provide a method and network element for forwarding a multicast message, by means of which a mobile subscriber may join and leave a group call of an external packet data network.

This object is achieved by a method for forwarding a multicast message received from an external packet data network to subscribers of a packet radio network, comprising the steps of:

storing a subscriber-specific information, which defines multicast messages to be received by said subscribers, in a network element of the packet radio network;

establishing a point to point connection between a multicast content provider and a subscriber, when said subscriber-specific information indicates that the received multicast message is to be received by the subscriber; and transmitting the multicast message from the multicast content provider to the subscriber via the established point to point connection.

Additionally, the above object is achieved by a network element for forwarding a multicast message received from an external packet data network to a subscriber of a packet radio network, comprising:

receiving means for receiving the multicast message from the external packet data network;

storing means for storing a subscriber-specific information which defines multicast messages to be received by the subscriber;

control means for establishing a point to point connection between a multicast content provider of a received multicast message and a subscriber, when the subscriber-specific information indicates that the received multicast message is to be received by the subscriber; and transmitting means for transmitting the received multicast message to the subscriber via the established point to point connection.

Accordingly, a multicast service such as the IP-M service, of an external packet data network can be implemented in the packet radio network, i.e. the GPRS. Thus, the network element, for example, the GGSN, plays an IP-M arbitrator, role and acts as a distribution node in which subscriber-specific lists of multicast groups, for example IP-M groups, to which specific subscribers want to listen are stored. The multicast messages may then be forwarded to a respective subscriber using a usual point to point connection.

Hence, only minor changes of the respective network element in the packet radio network are required.

Preferably, a request for available groups for multicast messages may be transmitted from a subscriber to the network element, wherein an information defining the desired groups which the subscriber wishes to join is returned from the subscriber to the network element. The subscriber request may be transmitted with an IP-M context request.

Preferably, the subscriber-specific information is a list which maps group identities of multicast groups to connection identifications of subscribers belonging to the multicast groups. In particular, the group identity may be an IP-M group ID and the connection identification may be a GPRS tunnel ID.

The transmitting means of the network element may be arranged to transmit an information defining available multicast groups to subscribers which have indicated their interest in multicast messages. The multicast group information may be transmitted with an IP-M context procedure.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

In the following the preferred embodiment of the method and network element according to the present invention will be described on the basis of a GPRS network shown in FIG. 1.

Figure 1:
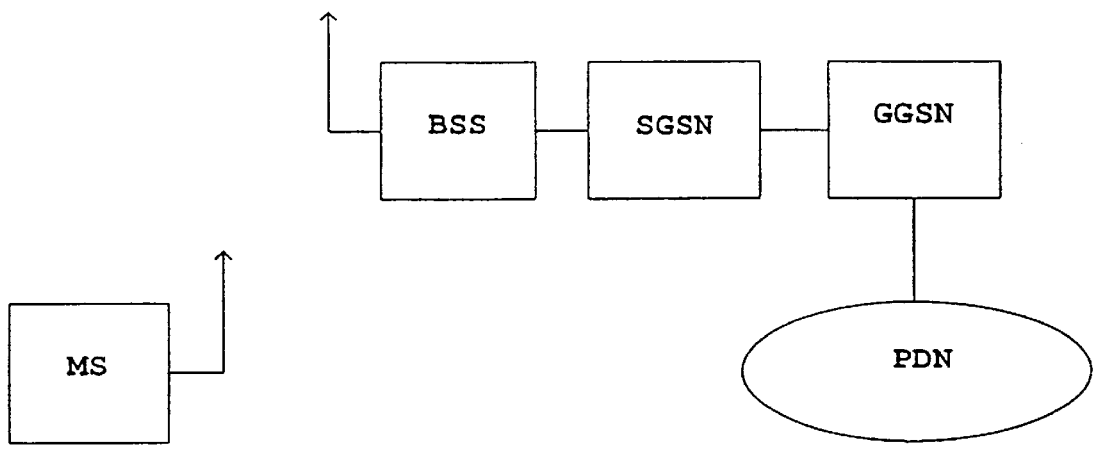
FIG. 1 shows a general block diagram of GPRS network to which an external packet data network is connected.

According to FIG. 1, the GPRS provides a bearer service from the boundary of a packet data network (PDN) to a GPRS MS. The serving GPRS support node (SGSN), which is at the same hierarchical level as a mobile switching center, keeps track of the individual MSs' location and performs security functions and access control. The SGSN is connected to a base station system (BSS) which provides a radio connection to the MS. The GGSN provides interworking with the external PDN and is connected with SGSNs via an IP-based GPRS backbone network.

According to the preferred embodiment of the present invention, a subscriber-specific information such as a list is stored in the GGSN, which defines multicatt groups joined by specific MSs. Thus, upon receiving an IP-M group call from the PDN, the GGSN may check the subscriber-specific information as to whether an MS of the GPRS network has joined the corresponding IP-M group, and establishes a point to point connection between the multicast content provider and a respective MS, in case the subscriber-specific information indicates that the respective subscriber has joined the corresponding multicast group.

Figure 2:
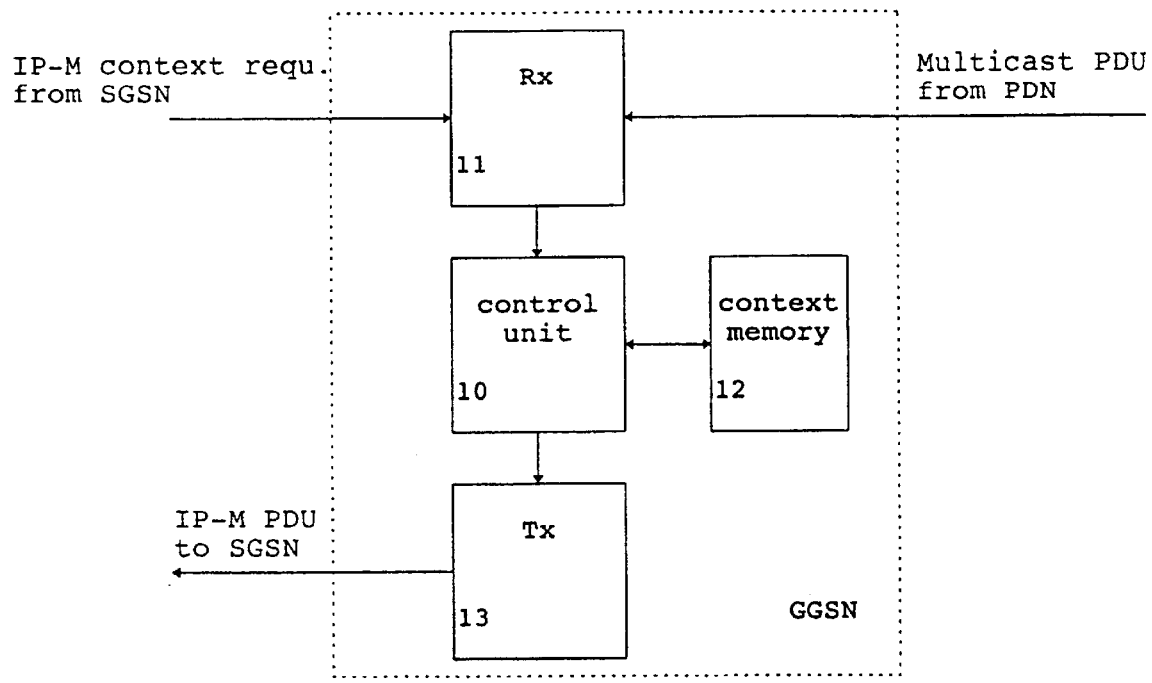
FIG. 2 shows a general block diagram of a gateway GPRS support node according to the preferred embodiment of the present invention.

In FIG. 2, a general block diagram of the GGSN is shown, comprising only those features essential to the present invention. According to FIG. 2, the GGSN comprises a receiver Rx 11 connected to the external PDN in order to receive data traffic, such as an IGMP (Internet Group Management Protocol) traffic. Furthermore, the receiver Rx 11 is connected to the SGSN in order to receive messages from the SGSN.

Furthermore, the GGSN comprises a transmitter Tx 13 arranged to transmit data traffic and messages to the SGSN. The required establishment of connections and control of transmitting and receiving operations is performed by a control unit 10 to which a context memory 12 is connected.

The context memory 12 is used to store a context information which is required by the control unit 10 in order to establish connections between subscribers such as the MS and the external PDN.

According to the preferred embodiment of the present invention, a GPRS point to point like context activation is used for forwarding an IP-M group call received from the external PDN. In the following, such an IP-M to IGMP context activation is described with reference to FIG. 3.

Figure 3:
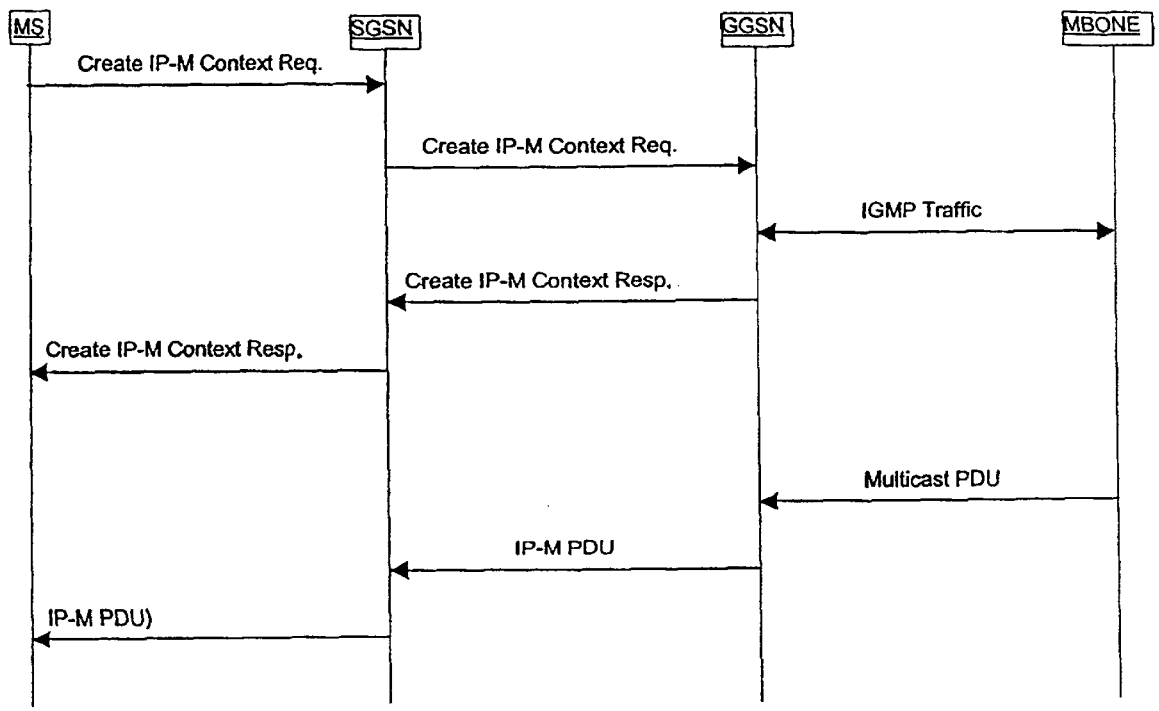
FIG. 3 shows a transmission diagram of a context activation with a multicast packet transfer according to the preferred embodiment of the present invention.

According to FIG. 3, the MS informs the SGSN by a Create IP-M Context Request message of the IP-M group call it wants to join. Then, the SGSN establishes an IP-M context and derives a GGSN address. Based on this address, the SGSN creates a tunnel identification (TID) for the requested IP-M context by combining the IMSI (International Mobile Station Identity) stored in the MM (Mobility Management) context with the NSAPI (Network Layer Service Access Point Identifier) received from the MS. Thus, the TID includes the IMSI and the NSAPI and is used to create a point to point (PTP) connection between the MS and the GGSN. Subsequently, the GGSN is informed by a Create IP-M Context Request message from the SGSN that the MS wants to join an IP-M group defined in this context activation message. The context activation message is received by the receiver Rx 11 of the GGSN and supplied to the control unit 10. Based thereon, the control unit 10 creates a list for every IP-M group, which maps the IP-M group ID to all tunnel IDs of the MSs belonging to the defined group. This list is stored in the context memory 12.

When the GGSN receives the IGMP traffic from a multicast bone (MBONE) of the PDN via the receiver Rx 11, the control unit 10 checks the subscriber-specific list stored in the context memory 12 as to any MS having joined the respective IP-M group. If the subscriber-specific list indicates a potential subscriber having joined the respective IP-M group, the GGSN returns a Create IP-M Context Response message to the SGSN to thereby establish a point to point connection. The SGSN inserts the NSAPI of the TID included in the Create IP-M Context Response message and the GGSN address in its PDP context and returns a Create IP-M Context Response message to the MS. The SGSN is now able to route IP-M PDU between the GGSN and the MS. Thus, the GGSN may now deliver a multicast PDU received from the PDN as a IP-M PDU via the SGSN to the MS.

The information about the available IP-M groups can be delivered to the MS with the IP-M context procedure. In the context activation message, the MS may only inform the GGSN that it is interested in IP-M messages. Thus, when the GGSN receives an information about IP-M groups from the PDN (Internet) it has a pipe to all interested MSs where it can transmit the corresponding group information. Based on this information, the MSs are able to inform the GGSN as to which multicast messages they want to receive, by using the Create IP-M Context Request message.

It is to be pointed out that the method and network element for forwarding the multicast message, as described in the preferred embodiment, can be applied in any packet radio network using a context activation for establishing point to point connections. Moreover, any kind of subscriber-specific information defining a relationship between multicast groups and joint subscribers may be stored in a respective arbitrator network element of the packet radio network. The above description of the preferred embodiment and the accompanying drawings are only intended to illustrate the present invention. The preferred embodiment of the invention may thus vary in the scope of the attached claims.

In summary, the present invention relates to a method and network element for forwarding a multicast message received from an external packet data network to subscribers of a packet radio network, wherein a subscriber-specific information defining multicast messages to be received by the subscribers is stored in a network element of the packet radio network. Based on this subscriber-specific information, a point to point connection is established between the multicast content provider of the multicast message and a subscriber having joined the corresponding multicast group. The subscriber may request a list of available multicast groups from the network element and may inform the network element of the multicast messages he wants to listen to, by using a point to point context activation. Thus, the network element which may be a gateway GPRS support node plays an arbitrator role for multicast messages, such that only minor changes of standard network elements are required.

What is claimed is:

1. A method for forwarding a multicast message received from an external packet data network (PDN) to subscribers (MS) of a packet radio network, comprising the steps of:
   a) a subscriber informing a Gateway GPRS Support Node (GGSN) of said packet radio network on desired groups for multicast messages which the subscriber wishes to join;
   b) storing a subscriber-specific information, which defines multicast messages from a multicast content provider to be received by said subscribers, in said Gateway GPRS Support Node, wherein said subscriber-specific information is a list which maps group identities of multicast groups to connection identifications of subscribers belonging to said multicast groups;
   c) establishing a point to point connection between said Gateway GPRS Support Node and said subscriber, when said subscriber-specific information indicates that multicast messages are to be received by said subscriber; and
   d) transmitting the multicast message from said multicast content provider to said subscriber via said established point to point connection.

2. A method according to claim 1, wherein a request for available groups for multicast messages is transmitted from a subscriber to said network element, and wherein an information defining the desired groups which the subscriber wishes to join is returned from said subscriber to said network element.

3. A method according to claim 1, wherein said group identity is an IP-M group ID and said connection identification is a GPRS tunnel ID.

4. A Gateway GPRS Support Node (GGSN) of a packet radio network for forwarding a multicast message received from an external packet data network (PDN) to a subscriber (MS) of said packet radio network, comprising:
   a) receiving means (11) for receiving said multicast message from said external packet data network (PDN), and for receiving an information from a subscriber defining desired groups for multicast messages which the subscriber wishes to join;
   b) storing means (12) for storing a subscriber-specific information which defines multicast messages from a multicast content provider to be received by said subscriber, wherein said subscriber-specific information is a list which maps group identities of multicast groups to connection identifications of subscribers belonging to said multicast groups;
   c) control means (10) for establishing a point to point connection between said Gateway GPRS Support Node and said subscriber (MS), when said subscriber-specific information indicates that said received multicast message is to be received by said subscriber (MS); and
   d) transmitting means (13) for transmitting said received multicast message to said subscriber (MS) via said established point to point connection.

5. A Gateway GPRS Support Node (GGSN) according to claim 4, wherein said control means (10) is arranged to generate said subscriber-specific information on the basis of a received subscriber request defining desired groups to be joined by the respective subscriber.

6. A Gateway GPRS Support Node (GGSN) according to claim 5, wherein said subscriber request is transmitted with an IP-M context request.

7. A Gateway GPRS Support Node (GGSN) according to claim 4, wherein said transmitting means (13) is arranged to transmit an information defining available multicast groups to subscribers which have indicated their interest in multicast messages.

8. A Gateway GPRS Support Node (GGSN) according to claim 7, wherein said multicast group information with an IP-M context procedure.

9. A Gateway GPRS Support Node (GGSN) according to claim 4, wherein said subscriber-specific information is a list which maps IP-M groups to tunnel identifications of subscribers belonging to said IP-M groups.

10. A Gateway GPRS Support Node (GGSN) according to claim 9, wherein said received multicast message is included in an IGMP traffic of an IPM network to which said gateway GPRS support node (GGSN) is connected.

* * * * *